US012282147B2

(12) United States Patent
Yang et al.

(10) Patent No.: US 12,282,147 B2
(45) Date of Patent: Apr. 22, 2025

(54) METHOD AND SYSTEM FOR ENHANCED PHOTON MICROSCOPY

(71) Applicant: Temple University-Of The Commonwealth System of Higher Education, Philadelphia, PA (US)

(72) Inventors: Weidong Yang, Penn Valley, PA (US); Andrew Ruba, Philadelphia, PA (US)

(73) Assignee: Temple University-Of The Commonwealth System of Higher Education, Philadelphia, PA (US)

( * ) Notice: Subject to any disclaimer, the term of this patent is extended or adjusted under 35 U.S.C. 154(b) by 144 days.

(21) Appl. No.: 17/780,044

(22) PCT Filed: Nov. 25, 2020

(86) PCT No.: PCT/US2020/062152
§ 371 (c)(1),
(2) Date: May 26, 2022

(87) PCT Pub. No.: WO2021/108493
PCT Pub. Date: Jun. 3, 2021

(65) Prior Publication Data
US 2023/0011994 A1 Jan. 12, 2023

Related U.S. Application Data

(60) Provisional application No. 62/941,118, filed on Nov. 27, 2019.

(51) Int. Cl.
*G02B 21/36* (2006.01)
*G01N 21/64* (2006.01)
(Continued)

(52) U.S. Cl.
CPC ....... *G02B 21/361* (2013.01); *G01N 21/6458* (2013.01); *G02B 21/08* (2013.01); *G02B 21/16* (2013.01)

(58) Field of Classification Search
None
See application file for complete search history.

(56) References Cited

U.S. PATENT DOCUMENTS 5,710,429 A * 1/1998 Alfano .................. G01N 21/49
250/341.1
5,719,399 A * 2/1998 Alfano .................. G01N 21/49
600/407

(Continued)

FOREIGN PATENT DOCUMENTS

WO 2013090360 6/2013

OTHER PUBLICATIONS

Liu, T., Rajadhyaksha, M. & Dickensheets, D.L. MEMS-in-the-lens architecture for a miniature high-NA laser scanning microscope. Light Sci Appl 8, 59 ( Jun. 26, 2019). (Year: 2019).*

(Continued)

*Primary Examiner* — Marcus H Taningco
*Assistant Examiner* — Djura Malevic
(74) *Attorney, Agent, or Firm* — Riverside Law LLP

(57) ABSTRACT

The present invention discloses a photon enhancement apparatus comprising a reflective component and 4f coherent imaging system, which increases a photon collection efficiency. The present invention also provides a microscope comprising said photon enhancement apparatus and methods of improving photon collection efficiency, signal-to-noise ratio, and/or optical resolution using the said photon enhancement apparatus.

15 Claims, 9 Drawing Sheets

(51) Int. Cl.
    *G02B 21/08* (2006.01)
    *G02B 21/16* (2006.01)

(56) References Cited

U.S. PATENT DOCUMENTS

| | | | | |
|---|---|---|---|---|
| 5,978,108 | A * | 11/1999 | Bai | G11B 7/0065 |
| 9,433,351 | B2 * | 9/2016 | Yu | G01N 21/49 |
| 9,545,340 | B1 * | 1/2017 | Knox | A61F 9/008 |
| 9,588,326 | B2 * | 3/2017 | Schwedt | G02F 1/29 |
| 9,945,993 | B2 * | 4/2018 | Aono | G02B 5/1857 |
| 10,006,917 | B2 * | 6/2018 | Dai | G01N 33/582 |
| 10,041,108 | B2 * | 8/2018 | Barish | G01N 21/6458 |
| 10,228,550 | B2 * | 3/2019 | Ou | G02B 21/367 |
| 10,371,580 | B2 * | 8/2019 | Bahk | G01J 9/0215 |
| 11,047,790 | B2 * | 6/2021 | Unlu | H05H 3/02 |
| 11,562,584 | B2 * | 1/2023 | Park | G02B 21/06 |
| 11,633,149 | B2 * | 4/2023 | Sanchez | A61B 5/4519 600/476 |
| 2006/0056468 | A1 * | 3/2006 | Dantus | G01B 9/02014 372/28 |
| 2006/0186325 | A1 * | 8/2006 | Johnston | G02B 6/262 250/234 |
| 2006/0257993 | A1 * | 11/2006 | McDevitt | G01N 21/6428 435/287.2 |
| 2007/0167835 | A1 * | 7/2007 | Yu | G01J 3/32 600/476 |
| 2010/0278400 | A1 * | 11/2010 | Piestun | G02B 21/0076 359/368 |
| 2011/0174986 | A1 * | 7/2011 | Kempe | G02B 21/16 250/216 |
| 2011/0233046 | A1 * | 9/2011 | Nikolenko | G02B 27/46 422/186 |
| 2011/0317000 | A1 * | 12/2011 | Lee | G02B 21/365 348/79 |
| 2012/0248402 | A1 * | 10/2012 | Rapaport | B82Y 40/00 257/E33.056 |
| 2012/0259228 | A1 * | 10/2012 | Yu | A61B 5/0059 600/476 |
| 2013/0147925 | A1 * | 6/2013 | Lew | G02B 27/58 348/49 |
| 2014/0078298 | A1 * | 3/2014 | Kudenov | G02B 5/1833 359/325 |
| 2014/0133011 | A1 | 5/2014 | Schwedt | |
| 2014/0313315 | A1 * | 10/2014 | Shoham | G02B 21/002 359/558 |
| 2015/0042780 | A1 * | 2/2015 | Palima | G02B 27/52 348/79 |
| 2015/0077535 | A1 * | 3/2015 | Izatt | G02B 5/18 348/79 |
| 2015/0204728 | A1 * | 7/2015 | Liu | G01J 9/02 356/497 |
| 2016/0305761 | A1 | 10/2016 | Girshovitz | |
| 2016/0341945 | A1 * | 11/2016 | Ou | H04N 23/56 |
| 2017/0038574 | A1 * | 2/2017 | Zhuang | G01N 21/6458 |
| 2017/0123196 | A1 * | 5/2017 | Svoboda | H04N 23/60 |
| 2017/0205627 | A1 * | 7/2017 | Fukuyama | G02B 27/0025 |
| 2018/0046096 | A1 | 2/2018 | Shibazaki | |
| 2018/0271367 | A1 * | 9/2018 | Izatt | A61B 3/1025 |
| 2018/0299251 | A1 * | 10/2018 | Liba | G02B 27/48 |
| 2021/0389244 | A1 * | 12/2021 | Bowman | G01S 17/894 |
| 2022/0155691 | A1 * | 5/2022 | Clube | G03F 1/70 |
| 2023/0011994 | A1 * | 1/2023 | Yang | G02B 21/08 |

OTHER PUBLICATIONS

Annibale, Paolo, et al. "Quantitative photo activated localization microscopy: unraveling the effects of photoblinking." PloS one 6.7 (2011): e22678.

Bernas, T., et al. "Minimizing photobleaching during confocal microscopy of fluorescent probes bound to chromatin: role of anoxia and photon flux." Journal of microscopy 215.3 (2004): 281-296.

Betzig, Eric, et al. "Imaging intracellular fluorescent proteins at nanometer resolution." Science 313.5793 (2006): 1642-1645.

Bewersdorf, J., R. Schmidt, and S. W. Hell. "Comparison of I5M and 4Pi-microscopy." Journal of microscopy 222.2 (2006): 105-117.

Chalfie, Martin, et al. "Green fluorescent protein as a marker for gene expression." Science 263.5148 (1994): 802-805.

Combs, Christian A. "Fluorescence microscopy: a concise guide to current imaging methods." Current Protocols in Neuroscience 50.1 (2010): 2-1.

Fedus, Kamil, and Georges Boudebs. "Experimental techniques using 4f coherent imaging system for measuring nonlinear refraction." Optics Communications 292 (2013): 140-148.

Hell, Stefan W., and Jan Wichmann. "Breaking the diffraction resolution limit by stimulated emission: stimulated-emission-depletion fluorescence microscopy." Optics letters 19.11 (1994): 780-782.

Hell, Stefan, and Ernst HK Stelzer. "Properties of a 4Pi confocal fluorescence microscope." JOSA A 9.12 (1992): 2159-2166.

Huang, Bo, Mark Bates, and Xiaowei Zhuang. "Super-resolution fluorescence microscopy." Annual review of biochemistry 78 (2009): 993-1016.

Jonkman, James, and Claire M. Brown. "Any way you slice it—a comparison of confocal microscopy techniques." Journal of biomolecular techniques: JBT 26.2 (2015): 54.

Leung, Bonnie O., and Keng C. Chou. "Review of super-resolution fluorescence microscopy for biology." Applied spectroscopy 65.9 (2011): 967-980.

Masters, John R. "HeLa cells 50 years on: the good, the bad and the ugly." Nature Reviews Cancer 2.4 (2002): 315.

Rust, Michael J., Mark Bates, and Xiaowei Zhuang. "Sub-diffraction-limit imaging by stochastic optical reconstruction microscopy (STORM)." Nature methods 3.10 (2006): 793.

Song, Loling, et al. "Influence of the triplet excited state on the photobleaching kinetics of fluorescein in microscopy." Biophysical journal 70.6 (1996): 2959-2968.

Thompson, Russell E., Daniel R. Larson, and Watt W. Webb. "Precise nanometer localization analysis for individual fluorescent probes." Biophysical journal 82.5 (2002): 2775-2783.

Wright, Adam, et al. "Singlet Oxygen-mediated Protein Oxidation: Evidence for the Formation of Reactive Side Chain Peroxides on Tyrosine Residues." Photochemistry and photobiology 76.1 (2002): 35-46.

Zimmer, Marc. "Green fluorescent protein (GFP): applications, structure, and related photophysical behavior." Chemical reviews 102.3 (2002): 759-782.

* cited by examiner

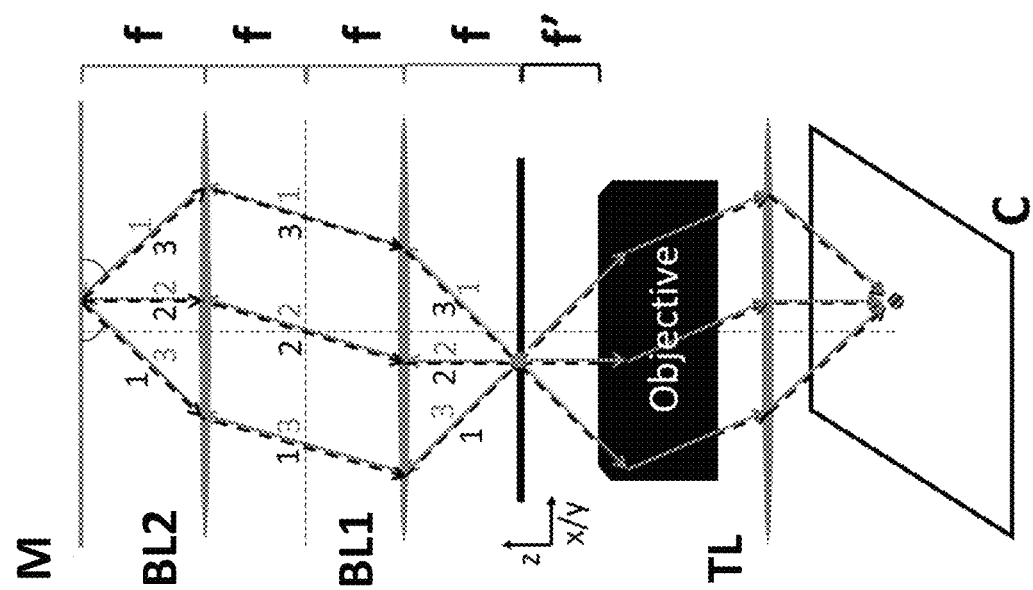
Figure 1B
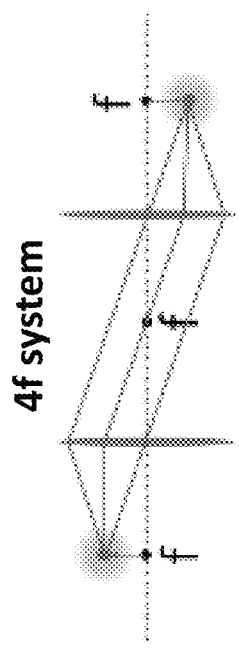
Figure 1A
Figure 1

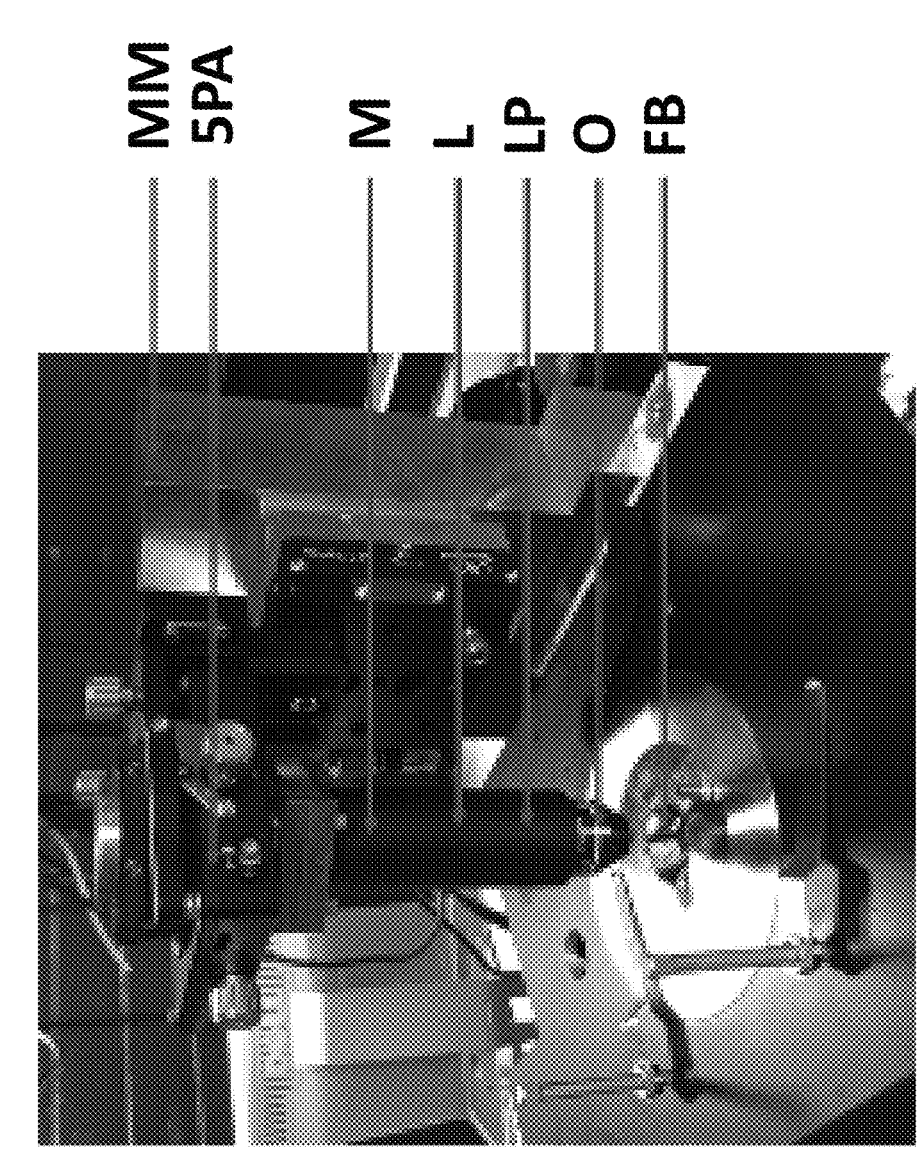
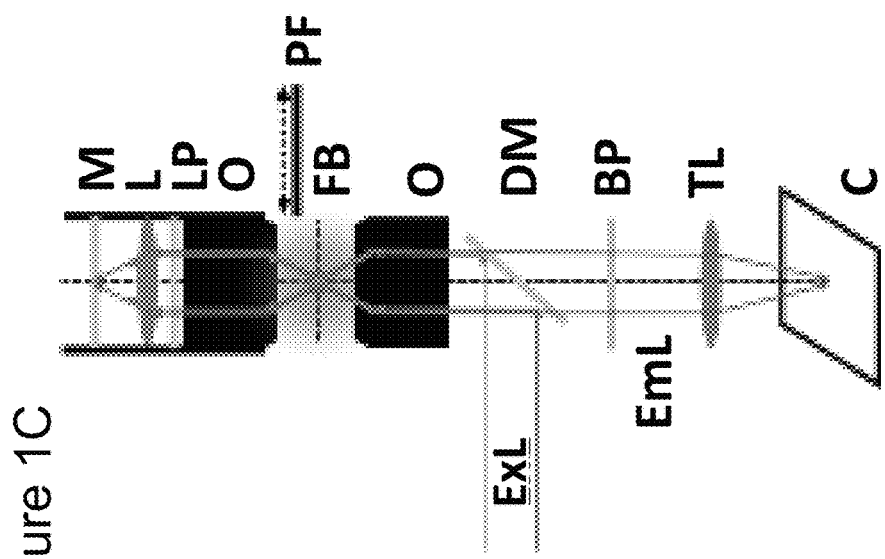
Figure 1C
Figure 1 (cont.)

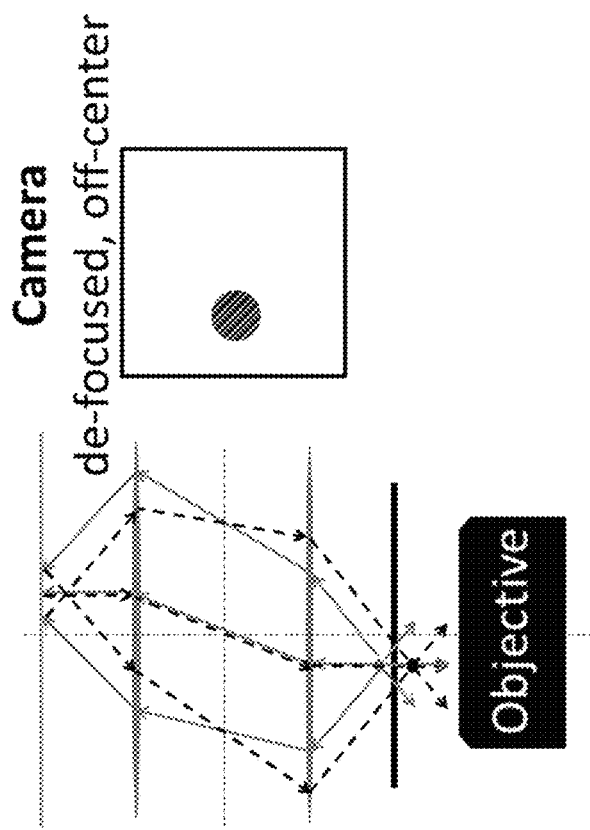
Figure 2C
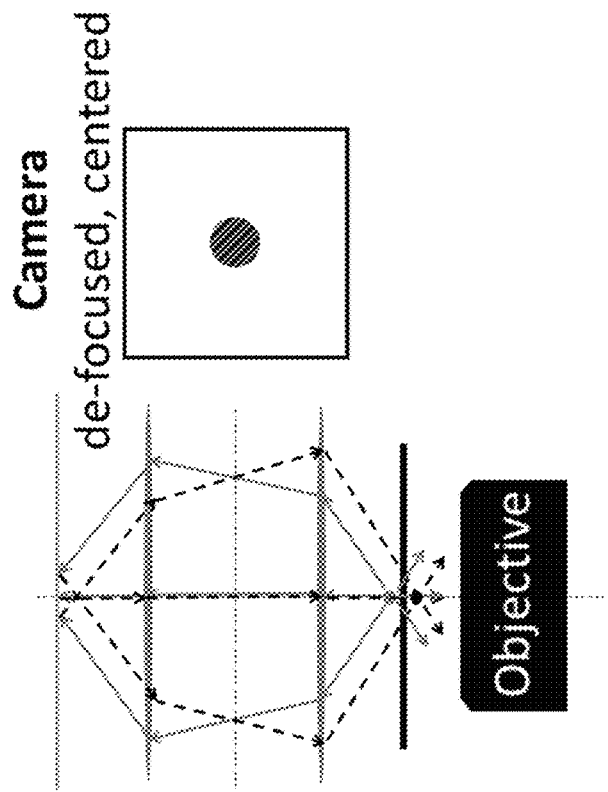
Figure 2D
Figure 2 (cont.)

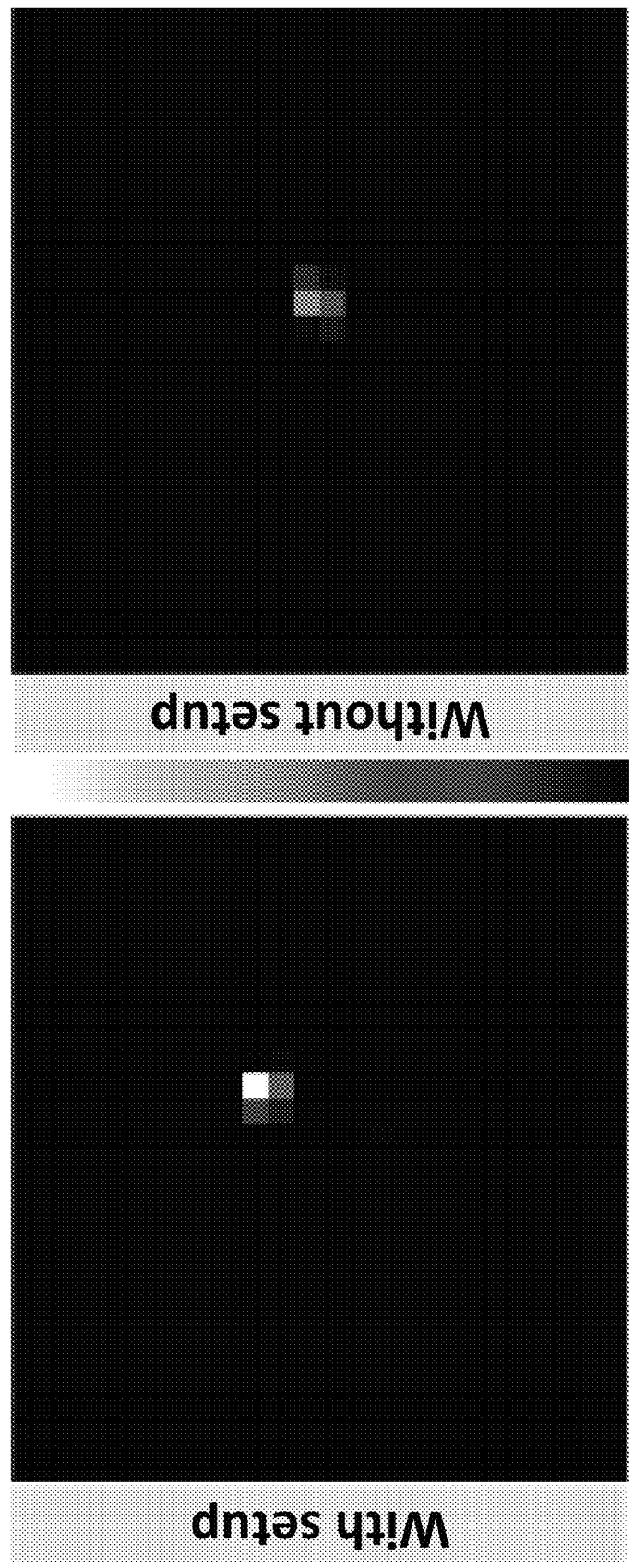

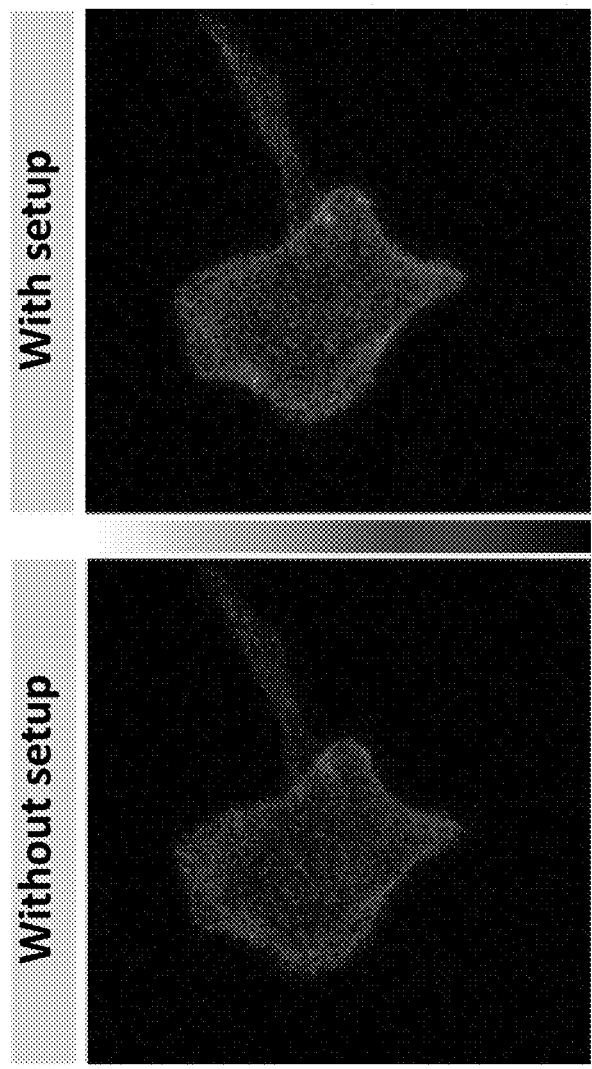
Figure 4A
Figure 4B
Figure 4C
Figure 4

METHOD AND SYSTEM FOR ENHANCED PHOTON MICROSCOPY

CROSS-REFERENCE TO RELATED APPLICATIONS

This application is a national phase application filed under 35 U.S.C. § 371 claiming benefit to PCT International Application PCT/US2020/062152, filed Nov. 25, 2020, which claims priority to and the benefit of U.S. Provisional Application No. 62/941,118, filed Nov. 27, 2019, the disclosures of which are incorporated herein by reference in their entireties.

BACKGROUND OF THE INVENTION

Optical resolution is the most critical parameter of any fluorescence microscopy imaging technique because it determines the level of detail that may be investigated in a biological system. For example, standard fluorescence microscopy has a resolution limit of ~200 nm, which limits its use in the study of sub-organelle-sized structures in the cell (Huang et al., 2009, Annual Review of Biochemistry, 78:993-1016; Leung et al., 2011, Applied Spectroscopy, 65:967-980). After the development of super-resolution and single particle tracking techniques, the resolution limit was reduced to ~10-100 nm depending on the technique (Huang et al., 2009, Annual Review of Biochemistry, 78:993-1016; Leung et al., 2011, Applied Spectroscopy, 65:967-980; Hell et al., 1994, Optics Letters, 19:780-782; Betzig et al., 2006, Science, 313:1642-1645). This breakthrough permitted the study of many processes that were previously inaccessible.

While much work occurs in standard fluorescence and super-resolution technique development, the optical resolution is always limited by the number of photons that can be collected by the objective because each photon is essentially a measurement of the location of the fluorophore (Thompson et al., 2002, Biophysical Journal, 82:2775-2783). A simple way of increasing the photon emission from the fluorophores is to increase the power of the excitation laser or lamp. However, this causes much quicker photobleaching of the fluorophores, much more out-of-focus fluorescence, and increased levels of photodamage and phototoxicity in cell samples (Wright et al., 2002, Photochemistry and Photobiology, 76:35-46; Bernas et al., 2004, Journal of Microscopy, 215:281-296; Song et al., 1996, Biophysical Journal, 70:2959-2968). As a result, many companies and research groups focus on increasing the numerical aperture (NA) of the objective and designing fluorophores with higher quantum yield and photostability. However, progress naturally plateaus and complex fluorophore labeling paradigms, particularly impractical in live cells, must be implemented.

One feature of many fluorophores is that they emit photons isotropically, either due to their physical properties, rotation, or bulk orientation. Since the objective may be mounted above (upright microscope) or below (inverted microscope) the fluorophore, photon emission from only one side of the fluorophore is collected. 4Pi microscopy mounts two opposing objectives on either side of the fluorophores; however, it essentially requires two independent microscopy setups and does not directly improve photon collection efficiency or lateral optical resolution (Hell et al., 1992, JOSA A, 9:2159-2166; Bewersdorf et al., 2006, Journal of Microscopy, 222:105-117).

Thus, there is a need in the art for improved methods and systems for imaging techniques, such as a light microscopy, with enhanced optical resolution, photon collection efficiency, and/or signal-to-noise ratio that do not result in photobleaching, photodamage, phototoxicity, and out-of-focus fluorescence. The present invention satisfies this unmet need.

BRIEF SUMMARY OF THE INVENTION

In various aspects, the present invention provides a photon enhancement apparatus comprising a reflective component and a coherent imaging system.

In one embodiment, the reflective component is a mirror.

In some embodiments, the coherent imaging system is a 4f coherent imaging system comprising at least four focal distances and a cascade of at least two Fourier transforms. In one embodiment, the 4f coherent imaging system comprises at least three lenses. In one embodiment, the 4f coherent imaging system comprises a tube lens and at least two biconvex lenses.

In various embodiments, the photon enhancement apparatus doubles a photon collection efficiency.

In some aspects, the photon enhancement apparatus further comprises a multi-point adjuster mount. In one embodiment, the reflective component and the coherent imaging system are mounted to the multi-point adjuster mount. In one embodiment, the reflective component is mounted above the coherent imaging system.

In one aspect, the present invention also discloses a microscope comprising a light source, an objective, a detector, and a photon enhancement apparatus. In some embodiments, the photon enhancement apparatus comprises a reflective component and a 4f coherent imaging system.

In some embodiments, the reflective component directs at least one photon to the detector.

In some embodiments, the photon enhancement apparatus doubles a photon collection efficiency of the detector. In some embodiments, the photon enhancement apparatus improves a signal-to-noise ratio. In some embodiments, the photon enhancement apparatus improves an optical resolution.

In various embodiments, the microscope further comprises a dichroic reflective component, a tube lens, a platform, a microscope mount, a second objective, and at least two filter. In one embodiment, the filter is a filter for selecting photons of different wavelengths.

In some embodiments, the microscope further comprises a multi-point adjuster mount.

In some embodiments, the microscope is an optical microscope, confocal microscope, single plane illumination microscope, fluorescence microscope, spinning disc confocal/fluorescence microscope, upright microscope, super-resolution microscope, stochastic optical reconstruction microscope, stimulated emission depletion microscope, photoactivated light microscope, or 4Pi microscope.

In one aspect, the present invention provides a method for increasing a number of photons recognized by a detector in a microscopy imaging technique. In some embodiments, the method comprises: (i) illuminating a sample in an illumination direction; (ii) using a photon enhancement apparatus to direct photons emitted, reflected, and/or scattered by the sample to a detector, wherein the photon enhancement apparatus comprises a reflective component and a 4f coherent imaging system; (iii) using the detector to collect the photons emitted, reflected, and/or scattered by the sample and the photons directed by the photon enhancement apparatus; and (iv) forming respective portions of the microscopy image representing the amount of photons collected from respective elements of the sample.

In some embodiments, the method doubles the number of photons recognized by the detector in the microscopy imaging technique. In some embodiments, the method enhances an optical resolution in the microscopy imaging technique. In some embodiments, the method improves the signal-to-noise ratio of the microscopy imaging technique.

In one embodiment, the illumination is performed by transmitting light through a lens.

In one embodiment, the sample is a planar sample, which is illuminated in an illumination direction in the plane of the same, and the photons are collected by a detector spaced from the sample in a direction transverse to the plane of the sample.

In various embodiments, the method further comprises: (v) using a mathematical expression which links the components of the microscopy image and the values of a Scattering parameter for multiple respective elements of the sample, to obtain the values of the scattering parameter, the respective value of the scattering parameter for each element of the sample being indicative of the tendency of that element of the sample to scatter photons; and (vi) forming an enhanced image of the sample using the obtained values of the scattering parameter.

In some embodiments, the mathematical expression expresses the value of the scattering parameter for a given said element of the sample by employing one or more average parameters, each indicating an average of the value of the scattering parameter over a given said element of the sample by employing one or more average parameters, each indicating an average of the value of the scattering parameter over a corresponding region which encircles a line extending parallel to the illumination direction to the given element of the sample.

BRIEF DESCRIPTION OF THE DRAWINGS

The following detailed description of various embodiments of the invention will be better understood when read in conjunction with the appended drawings. For the purpose of illustrating the invention, there are shown in the drawings illustrative embodiments. It should be understood, however, that the invention is not limited to the precise arrangements and instrumentalities of the embodiments shown in the drawings.

FIG. 1A through FIG. 1F, depicts a schematic representation of 4f coherent imaging system (or 4f system) principle and photon collection improvement. FIG. 1A depicts a schematic representation of 4f system working principle.

FIG. 1B depicts a schematic representation of 4f system working principle mounted above objective. BL1=biconvex lens 1; BL2=biconvex lens 2; M=mirror; TL=tube lens; C=camera; f=focal distance of biconvex lenses; and f'=focal distance of objective. Solid gray lines represent light rays emitted away from point source directly into objective and dashed black lines represent light rays reflected through 4f system. FIG. 1C depicts an implementation of the system describe in FIG. 1B on an Olympus IX81 fluorescence microscope. MM=microscope mount; 5PA=five-point adjuster; M=location of mirror in optical tube; L=location of tube lens; LP=location of long pass filter; O=10×0.3 NA Olympus objective; FB=location of fluorescent sample; PF=photofoil used to block reflection; DM=dichroic mirror; BP=bandpass filter; TL=tube lens; C=camera; ExL=excitation light; EmL=emission light. FIG. 1D depicts a representative heatmap comparison of the photon collection from static 488 nm laser in 10 µM AlexaFluor 488. Colorbar indicates normalized fluorescence intensity. FIG. 1E depicts a representative heatmap comparison of the photon collection from HeLa cells fixed and stained with AlexaFluor 488 phalloidin with and without photon enhancement setup. Colorbar indicates normalized fluorescence intensity. FIG. 1F depicts a table summarizing the results of photon collection shown in FIG. 1D and FIG. 1E. n=5 for each experimental case.

FIG. 2A through FIG. 2D, depicts a schematic representation of the reflection back to original position at focal plane occurs irrespective of fluorophore position. FIG. 2 displays different locations a fluorophore may be respective to the common focal plane of photon enhancement system and microscope objective as well as the expected effect on the image at the camera. M=mirror; BL1=biconvex lens 1; BL2=biconvex lens 2; f=focal distance of photon enhancement setup; and f'=focal distance of objective. FIG. 2A depicts a schematic representation of the effect that focused and centered camera has on the microscopy image. FIG. 2B depicts a schematic representation of the effect that focused and off-centered camera has on the microscopy image. FIG. 2C depicts a schematic representation of the effect that de-focused and centered camera has on the microscopy image. FIG. 2D depicts a schematic representation of the effect that de-focused and off-centered camera has on the microscopy image.

FIG. 3, comprising FIG. 3A and FIG. 3B, depicts representative results demonstrating photon collection improvement for mobile particles. FIG. 3A depicts a representative heatmap comparison of the photon collection from mobile 500 nm Tetraspeck beads with and without photon enhancement setup. Colorbar indicates normalized fluorescence intensity. FIG. 3B depicts a graph summarizing the results of photon collection count for mobile molecules with photon enhancement (n=1397) and without photon enhancement (n=2397). Pixel size=2.4 µm.

FIG. 4, comprising FIG. 4A through FIG. 4C, depicts representative results demonstrating photon collection improvement in confocal microscopy. FIG. 4A depicts an implementation of FIG. 1C on a Leica TCS SP8 laser scanning confocal microscope. FIG. 4B depicts a representative heatmap comparison of the photon collection from HeLa cells fixed and stained with AlexaFluor 488 phalloidin with and without photon enhancement setup. Colorbar indicates normalized fluorescence intensity. FIG. 4C depicts a table summarizing the results of photon collection from best trial.

DETAILED DESCRIPTION

Figure 1:
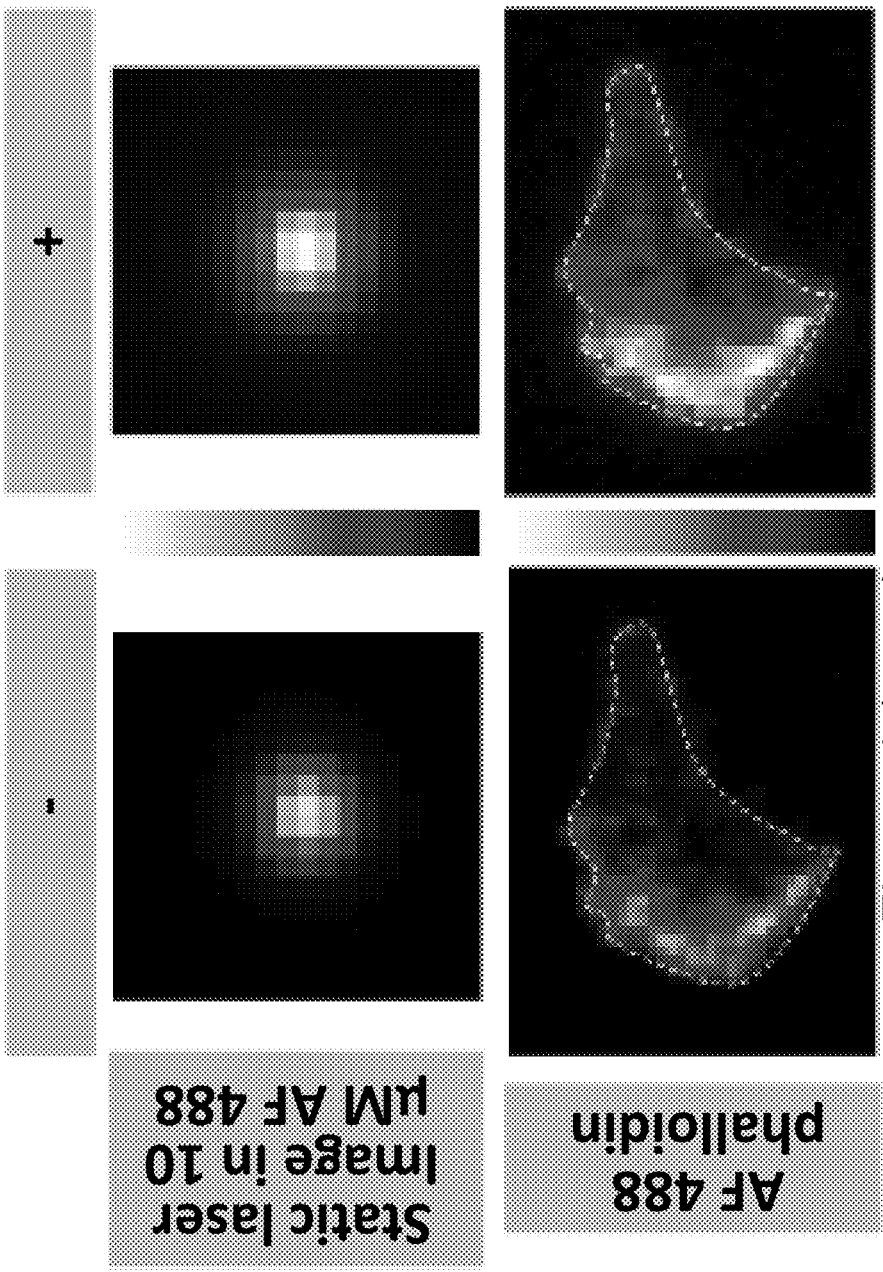
FIG. 1, comprising

The present invention is based, in part, on the discovery that combining a reflective component and a 4f coherent imaging system in a specific orientation and position enhanced photon collection efficiency, signal-to-noise ratio, and/or optical resolution by collecting, reflecting, and focusing photon to a specific area of interest. Thus, the present invention discloses a photon enhancement apparatus comprising a reflective component and 4f coherent imaging system. The present invention also provides a microscope comprising said photon enhancement apparatus and methods of improving photon collection efficiency, signal-to-noise ratio, and/or optical resolution using the said photon enhancement apparatus. The present invention additionally provides kits that find use in the practice of the methods of the invention.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

The term "about" will be understood by persons of ordinary skill in the art and will vary to some extent depending on the context in which it is used. As used herein when referring to a measurable value such as an amount, a temporal duration, and the like, the term "about" is meant to encompass variations of ±20% or 10%, more preferably ±5%, even more preferably ±1%, and still more preferably ±0.1% from the specified value, as such variations are appropriate to perform the disclosed methods.

The surface of a substrate or other support surface is treated herein as providing a directional orientation as follows: A direction away from the surface is "up", "over", or "above", while a direction toward the surface is "down", "under", or "below". The terms "upper" and "top" are typically applied to structures, components, or surfaces disposed away from the surface, while "lower" or "underlying" are applied to structures, components, or surfaces disposed toward the surface. In general, it should be understood that the above directional orientation is arbitrary and only for ease of description, and that a support structure or substrate may have any appropriate orientation.

As used herein, the terms "coherence imaging system" or "coherent imaging system" refer to advanced polarization interferometers that use spatio-temporal multiplex techniques to capture spectrally-resolved images of the polarization (Stokes parameters) of a radiant scene (e.g. plasma). Examples of "coherence imaging systems" include, but are not limited to a temporal coherence imaging system or temporal coherent imaging system; spatial coherence imaging system or spatial coherent imaging system; and 4f coherent imaging system or 4f system. The definitions and understandings of the entities falling within the scope of coherence imaging system are known to those of skill in the art, and such definitions are incorporated herein by reference and for the purposes of understanding the general nature of the subject matter of the present application. However, the following discussion is useful as a further understanding of some of these terms.

As used herein, the terms "4f coherent imaging system" or "4f system" refers to an imaging system comprising a cascade of two or more Fourier transforms and four or more focal distances. As used herein, the 4f coherent imaging system is a telescope with finite conjugates (e.g., an objective, two lenses, and detector). For example, 4f coherent imaging system comprises one focal distance to the left of the objective and one focal distance to the right of the detector.

As used herein, the term "sample" refers to any medium that can be evaluated in accordance with the invention, such as soil, water, biological sample, biological tissue, cell, etc.

As used herein, the term "microscope" refers to any optical configuration which magnifies an image of a sample. The term "microscope" refers to a device or instrument for magnifying an object, i.e., creating an image of an object for a user where the image is larger than the object. A microscope may be an "optical microscope" or "light microscope" referring to a device that uses light in combination with an optical system for magnifying an object.

Within a system, components and parts may be referred to in a similar manner. One component of a microscope system in which information is obtained about a sample's optical characteristics, for example, can be a "detector component" or simply "detector", meaning a component that detects light; similarly, a "light source component" or simply "light source" includes one or more light sources; an "optical component" performs an optical operation; a "photosensing component" performs a photosensing operation; a "deformable component" that can be changed in shape in response to stress or other internal or external forces, some examples of which are described below; a "signal-responsive component"; an "electrode component" or simply "electrode", meaning an electrically conductive part that is connected to a current path and is of the sort that operates in relation to one or more other electrode, such as by controlling an electrostatic field between the electrodes or by establishing electrical contact to a component that is between electrodes in a circuit; a "sensing component" that can sense an item, e.g., a shape of a deformable component; a "light-transmissive component" or simply "transmission component" transmits light; a "light-reflective component" or simply "reflective component" reflects light; and other examples are defined further below. Other parts or components can be characterized by their structure.

In the implementations described below, microscopes, or parts or components of microscopes may sometimes be referred to as "attached" to each other or to other structures, systems, parts, or components or vice versa, and operations are performed that "attach" structures, systems, or parts or components of structures or systems to each other or to other things or vice versa; the terms "attached", "attach", and related terms refer to any type of connecting that could be performed in the context. One type of attaching is "mounting", which occurs when a first part or component is attached to a second part or component that functions as a support for the first. In contrast, the more generic term "connecting" includes not only "attaching" and "mounting", but also making other types of connections such as electrical connections between or among devices or components of circuitry. A combination of one or more parts connected in any way is sometimes referred to herein as a "structure".

As used herein, the term "lens" refers to an object or device that focuses or otherwise modifies the direction of movement of light, electrons, etc. As examples, a lens may be an ocular lens, such the lens that is located closest to the eye when a user looks through a magnifying device, and an objective lens, such the lens that is located closest to the object.

As used herein, the term "eyepiece" or "ocular" refer to a component at the top of the microscope that a user looks through to observe an object. Standard eyepieces contain a lens having a magnifying power of 10× such that an eyepiece is referred to as a 10× eyepiece or an eyepiece having a power of 10×, or 10× magnification, etc. An eyepiece lens is also referred to as an ocular lens. Optional eyepieces of varying powers are available, typically from 5×-30×. A rubber or plastic eyecup for user comfort may cover an eyepiece.

As used herein, the terms "objective" or "objective lens" refers to an optical lens on a microscope nearest to the object being examined. An objective lens provides a fixed magnification and/or the capability of movement, for example as a "zoom" movement magnification.

As used herein, the term "zoom" refers to a range of magnification achieved by moving an objective lens closer or further away from an object.

As used herein, the term "magnification" refers to increasing the size of an image of an object under view, such as a part of an optics system of the present inventions. The magnification of an object can be calculated as a total increase in the size of the image of an object by multiplying the eyepiece magnification (via a lens in the eyepiece, such as an ocular lens), the objective lens magnification, and an auxiliary lens. As an example 10× eyepiece times the magnification from a 5× objective lens and a 0.3× auxiliary lens, there is a total magnification of 15× where × represents "times".

As used herein, the term "focus" as a verb refers to aligning the parts of an optical system for optimally viewing an object. In other words, when an image is "in focus" then the image appears to have sharp edges when viewed by a particular user.

As used herein, the term "resolution" refers to a measurement of a distance that is the shortest distance between two points on an object that can be distinguished as separate entities by a user or a camera system.

As used herein, the term "platform" or "base" refers to a part on which objects or samples are placed that are intended for microscopic viewing by a user. A base may be a boom stand, a platform, and the like.

As used herein, the term "axis" or "axis of ordinate" refers to a straight line of reference, such as an X-axis and a Y-axis. An X-axis reference line and Y-axis reference line may be perpendicular to each other in one dimensional space, i.e., located in the same plane, as in planar X and Y.

As used herein, the term "planar movement" refers to movement within a plane. For example, when X and Y reference lines are in the same plane, then "XY" or "X-Y" planar movement refers to the capability to move in either X or Y directions or a combination of X and Y directions such as for sideways movements and movements in a circle. For example, from a user's perspective, planar movement in the X direction may refer to moving in a left-right or side to side direction, while planar movement in the Y direction may refer to moving in a front to back or back to front. XY planar movement refers to a combined capability to move in both X or Y directions in addition to moving sideways in relation to the X and Y imaginary lines, i.e. as when moving in a circle.

As used herein, the term "numerical aperture (NA)" refers to a largest angle of incidence with respect to a propagation axis defined by an optical waveguide for which propagating optical radiation is substantially confined.

As used herein, the term "light" refers to electromagnetic radiation of any wavelength or frequency; unless otherwise indicated, a specific value for light wavelength or frequency is that of light propagating through vacuum. Light can also be described as provided by a "light source," which, unless otherwise specified, refers herein to any device, component, or structure that can provide light of the type described; examples of light sources relevant to the below-described implementations include various kinds of pulsed and unpulsed lasers and laser structures, light emitting diodes (LEDs), superluminescent LEDs (SLEDs), resonant cavity LEDs, sources of broadband light that is spectrally filtered such as with a monochromator, and so forth. A "tunable light source" is a light source that provides light with a predominant photon energy that can be changed in response to a signal or operation of some kind.

As used herein, the terms "light source component" and "light source" refer to one or more light sources.

The term "photon", as used herein, refers to a quantum of light, and the term "photon energy" refers to the energy of a photon. Light can be described as having a "photon energy distribution", meaning the combination of photon energies that are included in the light; highly monochromatic light, for example, has a photon energy distribution with one peak energy value. A photon energy distribution can be specified in space and time. For example, a photon energy distribution can be specified as a function of position, such as on a surface, or as a function of time; a photon energy distribution that is "homogeneous" is substantially the same at all relevant positions, such as the positions of a surface, while a photon energy distribution that is "stable" is substantially the same at all relevant times.

As used herein, the term "fluorescence" or "fluorescent" is a physical phenomenon based upon the ability of certain molecules to absorb and emit light at different wavelengths. The absorption of light (photons) at a first wavelength is followed by the emission of photons at a second wavelength and different energy.

As used herein the term "fluorophore" means a molecule, which is capable of absorbing energy at a wavelength range and releasing energy at a wavelength range other than the absorbance range. Fluorophores may be described in terms of their emission profile, or "color." Green fluorophores (for example Cy3, FITC, and Oregon Green) may be characterized by their emission at wavelengths generally in the range of 515-540 nm. Red fluorophores (for example Texas Red, Cy5, and tetramethylrhodamine) may be characterized by their emission at wavelengths generally in the range of 590-690 nm.

As used herein, the term "photobleaching" refers to the decrease in absorbance intensity upon exposure to light and/or, in the case of fluorescent materials, a decrease in emission intensity.

As used herein, the terms "detector component" or "detector" refer to a component that detects light.

As used herein, the term "light-reflective component" or "reflective component" refers to a component that reflects light (e.g., mirror).

As used herein, the terms "attached", "attach", and related terms refer to any type of connecting that could be performed in the context. One type of attaching is "mounting", which occurs when a first part or component is attached to a second part or component that functions as a support for the first.

In contrast, the more generic term "connecting" includes not only "attaching" and "mounting", but also making other types of connections such as electrical connections between or among devices or components of circuitry. A combination of one or more parts connected in any way is sometimes referred to herein as a "structure".

"Instructional material", as that term is used herein, includes a publication, a recording, a diagram, or any other medium of expression which can be used to communicate the usefulness of the nucleic acid, peptide, and/or compound of the invention in the kit for identifying, diagnosing or alleviating or treating the various diseases or disorders recited herein. Optionally, or alternately, the instructional material may describe one or more methods of identifying, diagnosing or alleviating the diseases or disorders in a cell or a tissue of a subject. The instructional material of the kit may, for example, be affixed to a container that contains one or more components of the invention or be shipped together with a container that contains the one or more components of the invention. Alternatively, the instructional material may be shipped separately from the container with the intention that the recipient uses the instructional material and the components cooperatively.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range, such as from 1 to 6, should be considered to have specifically disclosed subranges, such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

The present invention relates, in part, to a photon enhancement apparatus comprising a reflective component and 4f coherent imaging system that enhances photon collection efficiency, signal-to-noise ratio, and/or optical resolution by collecting, reflecting, and focusing photon to a specific area of interest. The present invention also discloses a microscope comprising said photon enhancement apparatus and methods of improving photon collection efficiency, signal-to-noise ratio, and/or optical resolution using the said photon enhancement apparatus. The present invention additionally provides kits that find use in the practice of the methods of the invention.

Photon Enhancement Apparatus

In one aspect, the present invention relates, in part, to a photon enhancement apparatus that focuses a photon to a specific area of interest. In various aspect of the present invention, the photon enhancement apparatus comprises a reflective component and a coherent imaging system. In some embodiments, the coherent imaging system is a temporal coherent imaging system, spatial coherent imaging system, 4f coherent imaging system, or any combination thereof. For example, in one embodiment, the photon enhancement apparatus comprises a reflective component and a 4f coherent imaging system.

In some embodiments, the reflective component is positioned above the 4f coherent imaging system. In various embodiments, the reflective component is a mirror (e.g., a glass-based mirror, plastic-based mirror, metal-based mirror, and other materials-based mirror known in the art), metal sheet, metal alloy sheet, steel sheet, stainless steel sheet, aluminum sheet, silver sheet, gold sheet, platinum sheet, copper sheet, or any combination thereof.

In one embodiment, the 4f coherent imaging system comprises a lens. In one embodiment, the 4f coherent imaging system comprises a first lens and a second lens. In one embodiment, the 4f coherent imaging system comprises a first lens, a second lens, and a third lens. In various embodiments, the lens is a converging lens, a diverging lens, or a combination thereof. In some embodiments, the lens is a tube lens, meniscus lens, convex lens, planoconvex lens, biconvex lens (double convex lens), converging meniscus lens, concave lens, planoconcave lens, biconcave lens (double concave lens), diverging meniscus lens, or any combination thereof. For example, in one embodiment, the 4f coherent imaging system comprises a biconvex lens. In another embodiment, the 4f coherent imaging system comprises a tube lens and at least two biconvex lenses.

In one aspect of the invention, the photon enhancement apparatus further comprises a detector. In one embodiment, the detector is a photon detector. In one embodiment, the photon detector is a camera. In one embodiment, the photon detector is a charge-coupled device (CCD) camera. In one embodiment, the photon detector is a complementary metal-oxide semiconductor (cMOS) camera. In one embodiment, the photon detector is a photomultiplier tube (PMT) detector. Thus, in one embodiment, the photon enhancement apparatus comprises a reflective component, a lens, and a camera. In another embodiment, the photon enhancement apparatus comprises a reflective component, a first lens, a second lens, a third lens, and a camera.

In another aspect of the invention, the photon enhancement apparatus further comprises an objective. Thus, in one embodiment, the photon enhancement apparatus comprises a reflective component, a lens, an objective, and a detector. In another embodiment, the photon enhancement apparatus comprises a reflective component, a first lens, a second lens, a third lens, an objective, and a detector.

In one embodiment, the detector is positioned below the lens, below the objective, and below the reflective component. In one embodiment, the detector is positioned below the first lens, below the objective, below the second lens, below the third lens, and below the reflective component. In one embodiment, the first lens is positioned above the detector, below the objective, below the second lens, below the third lens, and below the reflective component. In one embodiment, the objective is positioned above the detector, above the first lens, below the second lens, below the third lens, and below the reflective component. In one embodiment, the second lens is positioned above the detector, above the first lens, above the objective, below the third lens, and below the reflective component. In one embodiment, the third lens is positioned above the detector, above the first lens, above the objective, above the second lens, and below the reflective component. In one embodiment, the reflective component is positioned above the detector, above the first lens, above the objective, above the second lens, and above the third lens. For example, in one embodiment, the mirror is positioned above the camera, above the tube lens, above the objective, and above the at least two biconvex lenses.

In one embodiment, the photon enhancement apparatus further comprises a multi-point adjuster mount. In one embodiment, the photon enhancement apparatus comprises a two-point adjuster mount. In one embodiment, the photon enhancement apparatus comprises a three-point adjuster mount. In one embodiment, the photon enhancement apparatus comprises a four-point adjuster mount. In one embodiment, the photon enhancement apparatus comprises a five-point adjuster mount. In one embodiment, the photon enhancement apparatus comprises a six-point adjuster mount. In one embodiment, the photon enhancement apparatus comprises a seven-point adjuster mount. In one embodiment, the photon enhancement apparatus comprises an eight-point adjuster mount. In one embodiment, the photon enhancement apparatus comprises a nine-point adjuster mount. In one embodiment, the photon enhancement apparatus comprises a ten-point adjuster mount. In one embodiment, the photon enhancement apparatus comprises an eleven-point adjuster mount. In one embodiment, the photon enhancement apparatus comprises a twelve-point adjuster mount. In one embodiment, the photon enhancement apparatus comprises a thirteen-point adjuster mount. In one embodiment, the photon enhancement apparatus comprises a fourteen-point adjuster mount. In one embodiment, the photon enhancement apparatus comprises a fifteen-point adjuster mount. In one embodiment, the photon enhancement apparatus comprises a twenty-point adjuster mount.

In one embodiment, the reflective component and the 4f coherent imaging system are mounted to the multi-point adjuster mount. In one embodiment, the reflective component is mounted above the 4f coherent imaging system. In one embodiment, the reflective component is mounted to the multi-point mount above the 4f coherent imaging system.

In various aspects of the invention, the photon enhancement apparatus directs at least one photon to the detector. In one embodiment, the photon enhancement apparatus directs at least one photon to the detector by collecting and reflecting the at least one photon to the detector. In one embodiment, the photon enhancement apparatus directs at least one photon to the detector by collecting, reflecting, and focusing the at least one photon to the detector.

In various aspects of the invention, the reflective component directs at least one photon to the detector. In one embodiment, the reflective directs at least one photon to the detector by collecting and reflecting the at least one photon to the detector. In one embodiment, the reflective directs at least one photon to the detector by collecting, reflecting, and focusing the at least one photon to the detector.

In various embodiments, the photon enhancement apparatus of the present invention increases a photon collection efficiency. In one embodiment, the photon enhancement apparatus of the present invention increases the photon collection efficiency of the detector. In various embodiments, the photon enhancement apparatus increases the photon collection efficiency by directing at least one proton to the detector.

In one embodiment, the photon enhancement apparatus improves the photon collection efficiency by at least about 0.1%. In one embodiment, the photon enhancement apparatus improves the photon collection efficiency by at least about 1%. In one embodiment, the photon enhancement apparatus improves the photon collection efficiency by at least about 5%. In one embodiment, the photon enhancement apparatus increases the photon collection efficiency by at least about 10%. In one embodiment, the photon enhancement apparatus increases the photon collection efficiency by at least about 20%. In one embodiment, the photon enhancement apparatus increases the photon collection efficiency by at least about 25%. In one embodiment, the photon enhancement apparatus increases the photon collection efficiency by at least about 30%. In one embodiment, the photon enhancement apparatus increases the photon collection efficiency by at least about 50%. In one embodiment, the photon enhancement apparatus increases the photon collection efficiency by at least about 60%. In one embodiment, the photon enhancement apparatus increases the photon collection efficiency by at least about 75%. In one embodiment, the photon enhancement apparatus increases the photon collection efficiency by at least about 90%. In one embodiment, the photon enhancement apparatus increases the photon collection efficiency by at least about 100%. In one embodiment, the photon enhancement apparatus increases the photon collection efficiency by at least about 125%. In one embodiment, the photon enhancement apparatus increases the photon collection efficiency by at least about 150%. In one embodiment, the photon enhancement apparatus increases the photon collection efficiency by at least about 175%. In one embodiment, the photon enhancement apparatus increases the photon collection efficiency by at least about 200%. In one embodiment, the photon enhancement apparatus increases the photon collection efficiency by at least about 250%. In one embodiment, the photon enhancement apparatus increases the photon collection efficiency by at least about 300%. In one embodiment, the photon enhancement apparatus increases the photon collection efficiency by at least about 500%. In one embodiment, the photon enhancement apparatus increases the photon collection efficiency by at least about 700%. In one embodiment, the photon enhancement apparatus increases the photon collection efficiency by at least about 1000%. In one embodiment, the photon enhancement apparatus increases the photon collection efficiency by at least about 10000%.

In various embodiments, the photon enhancement apparatus of the present invention improves an optical resolution. In one embodiment, the photon enhancement apparatus of the present invention improves the optical resolution by directing at least one proton to the detector.

In one embodiment, the photon enhancement apparatus improves the optical resolution by at least about 0.1%. In one embodiment, the photon enhancement apparatus improves the optical resolution by at least about 1%. In one embodiment, the photon enhancement apparatus improves the optical resolution by at least about 5%. In one embodiment, the photon enhancement apparatus improves the optical resolution by at least about 10%. In one embodiment, the photon enhancement apparatus improves the optical resolution by at least about 20%. In one embodiment, the photon enhancement apparatus improves the optical resolution by at least about 25%. In one embodiment, the photon enhancement apparatus improves the optical resolution by at least about 30%. In one embodiment, the photon enhancement apparatus improves the optical resolution by at least about 50%. In one embodiment, the photon enhancement apparatus improves the optical resolution by at least about 60%. In one embodiment, the photon enhancement apparatus improves the optical resolution by at least about 75%. In one embodiment, the photon enhancement apparatus improves the optical resolution by at least about 90%. In one embodiment, the photon enhancement apparatus improves the optical resolution by at least about 100%. In one embodiment, the photon enhancement apparatus improves the optical resolution by at least about 125%. In one embodiment, the photon enhancement apparatus improves the optical resolution by at least about 150%. In one embodiment, the photon enhancement apparatus improves the optical resolution by at least about 175%. In one embodiment, the photon enhancement apparatus improves the optical resolution by at least about 200%. In one embodiment, the photon enhancement apparatus improves the optical resolution by at least about 250%. In one embodiment, the photon enhancement apparatus improves the optical resolution by at least about 300%. In one embodiment, the photon enhancement apparatus improves the optical resolution by at least about 500%. In one embodiment, the photon enhancement apparatus improves the optical resolution by at least about 700%. In one embodiment, the photon enhancement apparatus improves the optical resolution by at least about 1000%. In one embodiment, the photon enhancement apparatus improves the optical resolution by at least about 10000%.

In various embodiments, the photon enhancement apparatus of the present invention increases a signal-to-noise ratio. In one embodiment, the photon enhancement apparatus of the present invention increases the signal-to-noise ratio of the detector. In various embodiments, the photon enhancement apparatus increases the signal-to-noise ratio by directing at least one proton to the detector.

In one embodiment, the photon enhancement apparatus increases the signal-to-noise ratio by at least about 0.1%. In one embodiment, the photon enhancement apparatus increases the signal-to-noise ratio by at least about 1%. In one embodiment, the photon enhancement apparatus increases the signal-to-noise ratio by at least about 5%. In one embodiment, the photon enhancement apparatus increases the signal-to-noise ratio by at least about 10%. In one embodiment, the photon enhancement apparatus increases the signal-to-noise ratio by at least about 20%. In one embodiment, the photon enhancement apparatus increases the signal-to-noise ratio by at least about 25%. In one embodiment, the photon enhancement apparatus increases the signal-to-noise ratio by at least about 30%. In one embodiment, the photon enhancement apparatus increases the signal-to-noise ratio by at least about 50%. In one embodiment, the photon enhancement apparatus increases the signal-to-noise ratio by at least about 60%. In one embodiment, the photon enhancement apparatus increases the signal-to-noise ratio by at least about 75%. In one embodiment, the photon enhancement apparatus increases the signal-to-noise ratio by at least about 90%. In one embodiment, the photon enhancement apparatus increases the signal-to-noise ratio by at least about 100%. In one embodiment, the photon enhancement apparatus increases the signal-to-noise ratio by at least about 125%. In one embodiment, the photon enhancement apparatus increases the signal-to-noise ratio by at least about 150%. In one embodiment, the photon enhancement apparatus increases the signal-to-noise ratio by at least about 175%. In one embodiment, the photon enhancement apparatus increases the signal-to-noise ratio by at least about 200%. In one embodiment, the photon enhancement apparatus increases the signal-to-noise ratio by at least about 250%. In one embodiment, the photon enhancement apparatus increases the signal-to-noise ratio by at least about 300%. In one embodiment, the photon enhancement apparatus increases the signal-to-noise ratio by at least about 500%. In one embodiment, the photon enhancement apparatus increases the signal-to-noise ratio by at least about 700%. In one embodiment, the photon enhancement apparatus increases the signal-to-noise ratio by at least about 1000%. In one embodiment, the photon enhancement apparatus increases the signal-to-noise ratio by at least about 10000%.

Microscope

In one aspect, the present invention also provides a microscope comprising the photon enhancement apparatus described above. In one embodiment, the microscope comprises a light source, an objective, a detector, and any of the photon enhancement apparatus described above.

In some embodiments, the microscope further comprises a reflective component, a lens, a platform, a microscope mount, a second objective, a filter, or any combination thereof.

In one embodiment, the reflective component is a dichroic reflective component. In one embodiment, the microscope mount is a multi-point adjuster mount.

In some embodiments, the microscope comprises at least two filters. In one embodiment, the filter is an optical filter. In some embodiments, the optical filter is an absorptive filter, interference (dichroic) filter, monochromic filter, infrared filter, ultraviolet (UV) filter, neutral density filter, guided-mode resonance filter, metal mesh filter, polarization filter, arc welding filter, wedge filter, photographic filter, or any combination thereof. In various embodiments, the filter is a filter for selecting photons of different wavelengths. In one embodiment, the filter is a longpass filter. In one embodiment, the filter is a shortpass filter. In one embodiment, the filter is a band-pass filter.

In various embodiments, the microscope is an optical (light) microscope. Examples of optical microscopes include, but are not limited to: a simple microscope, compound microscope, stereo microscope, comparison microscope, inverted microscope, fiber optic microscope, fiber optic connector inspection microscope, traveling microscope, petrographic microscope, polarizing microscope, phase contrast microscope, illumination microscope, single plane illumination microscope, fluorescence microscope, epifluorescence microscope, laser scanning fluorescence microscope, 4Pi microscope, confocal microscope, two-photon microscope, student microscope, ultramicroscope, spinning disc confocal/fluorescence microscope, upright microscope, super-resolution microscope, stochastic optical reconstruction microscope, stimulated emission depletion microscope, photoactivated light microscope, and digital microscope.

In various embodiments, the photon enhancement apparatus directs at least one photon to the detector. In one embodiment, the photon enhancement apparatus directs at least one photon to the detector by collecting and reflecting the at least one photon to the detector. In one embodiment, the photon enhancement apparatus directs at least one photon to the detector by collecting, reflecting, and focusing the at least one photon to the detector.

In some embodiments, the reflective component of the photon enhancement apparatus directs at least one photon to the detector. In one embodiment, the reflective component of the photon enhancement apparatus directs at least one photon to the detector by collecting and reflecting the at least one photon to the detector. In one embodiment, the reflective component of the photon enhancement apparatus directs at least one photon to the detector by collecting, reflecting, and focusing the at least one photon to the detector.

Thus, in various embodiments, the microscope of the present invention has an increased photon collection efficiency. In one embodiment, the photon collection efficiency of the microscope is increased because the photon enhancement apparatus directs at least one proton to the detector.

In one embodiment, the photon collection efficiency of the microscope is increased by at least about 0.1%. In one embodiment, the photon collection efficiency of the microscope is increased by at least about 1%. In one embodiment, the photon collection efficiency of the microscope is increased by at least about 5%. In one embodiment, the photon collection efficiency of the microscope is increased by at least about 10%. In one embodiment, the photon collection efficiency of the microscope is increased by at least about 20%. In one embodiment, the photon collection efficiency of the microscope is increased by at least about 25%. In one embodiment, the photon collection efficiency of the microscope is increased by at least about 30%. In one embodiment, the photon collection efficiency of the microscope is increased by at least about 50%. In one embodiment, the photon collection efficiency of the microscope is increased by at least about 60%. In one embodiment, the photon collection efficiency of the microscope is increased by at least about 75%. In one embodiment, the photon collection efficiency of the microscope is increased by at least about 90%. In one embodiment, the photon collection efficiency of the microscope is increased by at least about 100%. In one embodiment, the photon collection efficiency of the microscope is increased by at least about 125%. In one embodiment, the photon collection efficiency of the microscope is increased by at least about 150%. In one embodiment, the photon collection efficiency of the microscope is increased by at least about 175%. In one embodiment, the photon collection efficiency of the microscope is increased by at least about 200%. In one embodiment, the photon collection efficiency of the microscope is increased by at least about 250%. In one embodiment, the photon collection efficiency of the microscope is increased by at least about 300%. In one embodiment, the photon collection efficiency of the microscope is increased by at least about 500%. In one embodiment, the photon collection efficiency of the microscope is increased by at least about 700%. In one embodiment, the photon collection efficiency of the microscope is increased by at least about 1000%. In one embodiment, the photon collection efficiency of the microscope is increased by at least about 10000%.

In various embodiments, the microscope of the present invention has an improved optical resolution. In one embodiment, the optical resolution of the microscope is improved because the photon enhancement apparatus directs at least one proton to the detector.

In one embodiment, the optical resolution of the microscope is improved by at least about 0.1%. In one embodiment, the optical resolution of the microscope is improved by at least about 1%. In one embodiment, the optical resolution of the microscope is improved by at least about 5%. In one embodiment, the optical resolution of the microscope is improved by at least about 10%. In one embodiment, the optical resolution of the microscope is improved by at least about 20%. In one embodiment, the optical resolution of the microscope is improved by at least about 25%. In one embodiment, the optical resolution of the microscope is improved by at least about 30%. In one embodiment, the optical resolution of the microscope is improved by at least about 50%. In one embodiment, the optical resolution of the microscope is improved by at least about 60%. In one embodiment, the optical resolution of the microscope is improved by at least about 75%. In one embodiment, the optical resolution of the microscope is improved by at least about 90%. In one embodiment, the optical resolution of the microscope is improved by at least about 100%. In one embodiment, the optical resolution of the microscope is improved by at least about 125%. In one embodiment, the optical resolution of the microscope is improved by at least about 150%. In one embodiment, the optical resolution of the microscope is improved by at least about 175%. In one embodiment, the optical resolution of the microscope is improved by at least about 200%. In one embodiment, the optical resolution of the microscope is improved by at least about 250%. In one embodiment, the optical resolution of the microscope is improved by at least about 300%. In one embodiment, the optical resolution of the microscope is improved by at least about 500%. In one embodiment, the optical resolution of the microscope is improved by at least about 700%. In one embodiment, the optical resolution of the microscope is improved by at least about 1000%. In one embodiment, the optical resolution of the microscope is improved by at least about 10000%.

In various embodiments, the microscope of the present invention has an increased signal-to-noise ratio. In one embodiment, the signal-to-noise ratio of the microscope is increased because the photon enhancement apparatus directs at least one proton to the detector.

In one embodiment, the signal-to-noise ratio of the microscope is increased by at least about 0.1%. In one embodiment, the signal-to-noise ratio of the microscope is increased by at least about 1%. In one embodiment, the signal-to-noise ratio of the microscope is increased by at least about 5%. In one embodiment, the signal-to-noise ratio of the microscope is increased by at least about 10%. In one embodiment, the signal-to-noise ratio of the microscope is increased by at least about 20%. In one embodiment, the signal-to-noise ratio of the microscope is increased by at least about 25%. In one embodiment, the signal-to-noise ratio of the microscope is increased by at least about 30%. In one embodiment, the signal-to-noise ratio of the microscope is increased by at least about 50%. In one embodiment, the signal-to-noise ratio of the microscope is increased by at least about 60%. In one embodiment, the signal-to-noise ratio of the microscope is increased by at least about 75%. In one embodiment, the signal-to-noise ratio of the microscope is increased by at least about 90%. In one embodiment, the signal-to-noise ratio of the microscope is increased by at least about 100%. In one embodiment, the signal-to-noise ratio of the microscope is increased by at least about 125%. In one embodiment, the signal-to-noise ratio of the microscope is increased by at least about 150%. In one embodiment, the signal-to-noise ratio of the microscope is increased by at least about 175%. In one embodiment, the signal-to-noise ratio of the microscope is increased by at least about 200%. In one embodiment, the signal-to-noise ratio of the microscope is increased by at least about 250%. In one embodiment, the signal-to-noise ratio of the microscope is increased by at least about 300%. In one embodiment, the signal-to-noise ratio of the microscope is increased by at least about 500%. In one embodiment, the signal-to-noise ratio of the microscope is increased by at least about 700%. In one embodiment, the signal-to-noise ratio of the microscope is increased by at least about 1000%. In one embodiment, the signal-to-noise ratio of the microscope is increased by at least about 10000%.

Methods

In various aspects, the present invention provides a method for increasing a number of photons recognized by a detector in an imaging technique. In some aspects, the present invention also discloses a method for increasing a photon collection efficiency in an imaging technique. In some aspects, the present invention discloses a method for improving an optical resonance in an imaging technique. In some aspects, the present invention discloses a method for increasing a signal-to-noise ratio in an imaging technique.

In one aspect, the method of the present invention increases a photon collection efficiency in an imaging technique. In another aspect, the method of the present invention improves an optical resonance in an imaging technique. In another aspect, the method of the present invention increases a signal-to-noise ratio in an imaging technique. In various embodiments, the imaging technique is a microscopy imaging technique.

In various embodiments, the method comprises: (i) illuminating a sample in an illumination direction; (ii) using a photon enhancement apparatus to direct photons emitted, reflected, and/or scattered by the sample to a detector, wherein the photon enhancement apparatus comprises a reflective component and a 4f coherent imaging system; (iii) using the detector to collect the photons emitted, reflected, and/or scattered by the sample and the photons directed by the photon enhancement apparatus; and (iv) forming respective portions of the microscopy image representing the amount of photons collected from respective elements of the sample.

In some embodiments, the method further comprises: (v) using a mathematical expression which links the components of the microscopy image and the values of a Scattering parameter for multiple respective elements of the sample, to obtain the values of the scattering parameter, the respective value of the scattering parameter for each element of the sample being indicative of the tendency of that element of the sample to scatter photons; and (vi) forming an enhanced image of the sample using the obtained values of the scattering parameter.

In some embodiments, the mathematical expression expresses the value of the scattering parameter for a given said element of the sample by employing one or more average parameters, each indicating an average of the value of the scattering parameter over a given said element of the sample by employing one or more average parameters, each indicating an average of the value of the scattering parameter over a corresponding region which encircles a line extending parallel to the illumination direction to the given element of the sample.

In some embodiments, the sample is a planar sample. In some embodiments, the sample is illuminated in an illumination direction in the plane of the same. In some embodiments, the illumination is performed by transmitting light through a lens. In some embodiments, the photons are collected by a detector spaced from the sample in a direction transverse to the plane of the sample.

Kits

The present invention also pertains to kits useful in the methods of the invention. Such kits comprise various combinations of components useful in any of the methods described elsewhere herein, including for example, materials for preparing the photon enhancement apparatus of the invention, materials for preparing the microscope of the invention, materials for imaging techniques using the photon enhancement apparatus of the invention, materials for increasing photon collection efficiency in imaging techniques using the photon enhancement apparatus of the invention, materials for improving optical resonance in imaging techniques using the photon enhancement apparatus of the invention, materials for increasing signal-to-noise ratio in imaging techniques using the photon enhancement apparatus of the invention, and instructional material. For example, in one embodiment, the kit comprises components useful for the preparation of the desired photon enhancement apparatus. In a further embodiment, the kit comprises components useful for the preparation of the desired microscope. In a further embodiment, the kit comprises components useful for the imaging techniques of a desired samples. In a further embodiment, the kit comprises components useful for increasing photon collection efficiency in the desired imaging techniques. In a further embodiment, the kit comprises components useful for the improvement of optical resonance in the desired imaging techniques. In a further embodiment, the kit comprises components useful for increasing signal-to-noise ratio in the desired imaging techniques.

It will be understood by those of skill in the art that numerous and various modifications can be made without departing from the spirit of the present disclosure. Therefore, it should be clearly understood that the forms disclosed herein are illustrative only and are not intended to limit the scope of the present disclosure.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1: Photon Enhancement Microscopy

Fluorescence microscopy and 4Pi microscopy are the two current states of the technology. Fluorescence microscopy, in general, places an objective on one side of the emitter and, thus, collects photons from only one side of the fluorophore. It is only able to collect ~30% of the total amount of emitted photons. 4Pi microscopy places two objectives on opposing sides of the fluorophore but also essentially implements two entire microscopy setups (two objectives, 2 filter sets, 2 tube lenses, and 2 cameras). In this way, axial optical resolution is improved through interference but the photons from either side of the fluorophore never reconverge at a common detector (camera) and, thus, photon collection efficiency is never improved.

On the other hand, the present invention described herein reconverged the photons emitted from both sides of the fluorophore. The present invention 1) improved photon collection efficiency and optical resolution on all fluorescence microscopes; 2) allowed for a lower power illumination source, which reduced photobleaching, out-of-focus fluorescence, and phototoxicity in cells; and 3) is optionally incorporated into any microscopes that have the space to implement the present invention.

Figure 2:
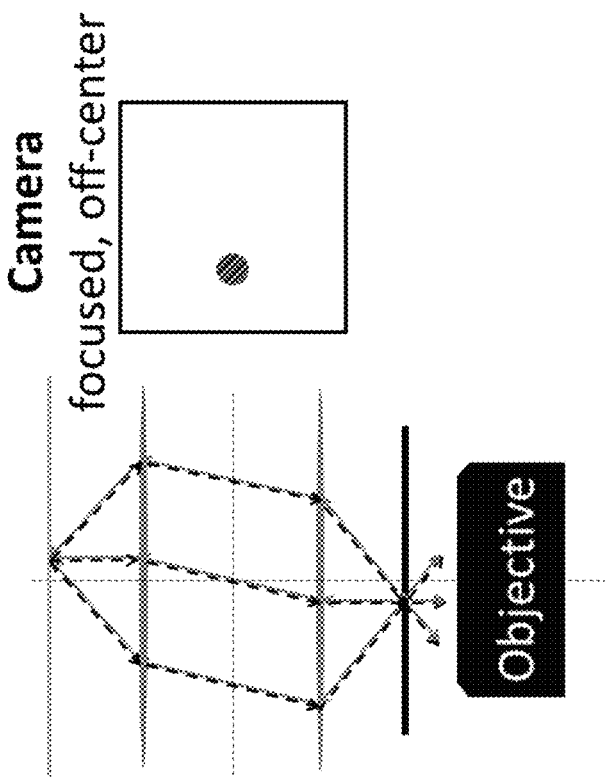
FIG. 2, comprising
Figure 2:
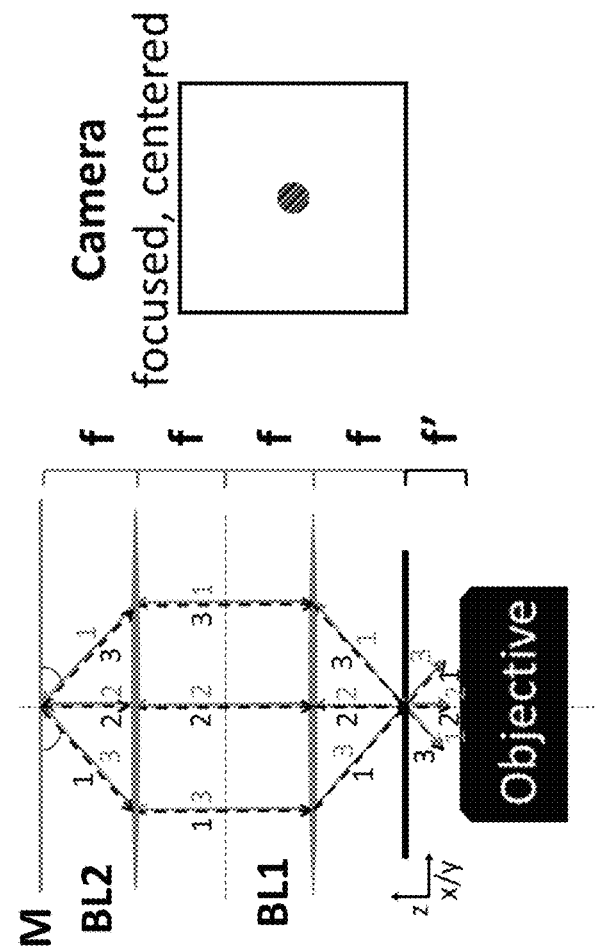

More specifically, the present study demonstrated that a 4f system (Fedus et al., 2013, Optics Communications, 292: 140-148) with a mirror positioned at the back focal plane collected, reflected, and focused photons emitted from a fluorophore away from the objective back toward the exact fluorophore location and into the objective as if they had been emitted toward the objective initially (FIG. 1A and FIG. 1B). This phenomenon occurred irrespective of the fluorophore's location at the objective focal plane (FIG. 2) and had the benefit of theoretically doubling the photon collection efficiency and improving the signal-to-noise ratio and lateral optical resolution accordingly. The study described herein demonstrated the working principle in both epifluorescence and confocal microscopy (Combs et al., 2010, Current Protocols in Neuroscience, 50:1-25) using an infinity-corrected objective (Combs et al., 2010, Current Protocols in Neuroscience, 50:1-25) and tube lens to construct a 4f system. Compared to simple lenses, these optical components had a more amenable working distance, NA, and transmittance. In addition to immobile in vitro and in vivo samples, the photon collection efficiency of mobile, passively diffusing fluorescent particles was demonstrated. Overall, this simple, cost-effective setup is, optionally, incorporated into any standard fluorescence or super-resolution microscopy setup to increase the photon collection efficiency.

After manufacturing a mount with a five-point adjuster for the 4f system (FIG. 1C), it was positioned above the stage of an Olympus IX81 fluorescence microscope and lowered the photon enhancement setup until its focal plane overlapped with the focal plane of the lower Olympus 10×0.3

Figures 1, 1F:
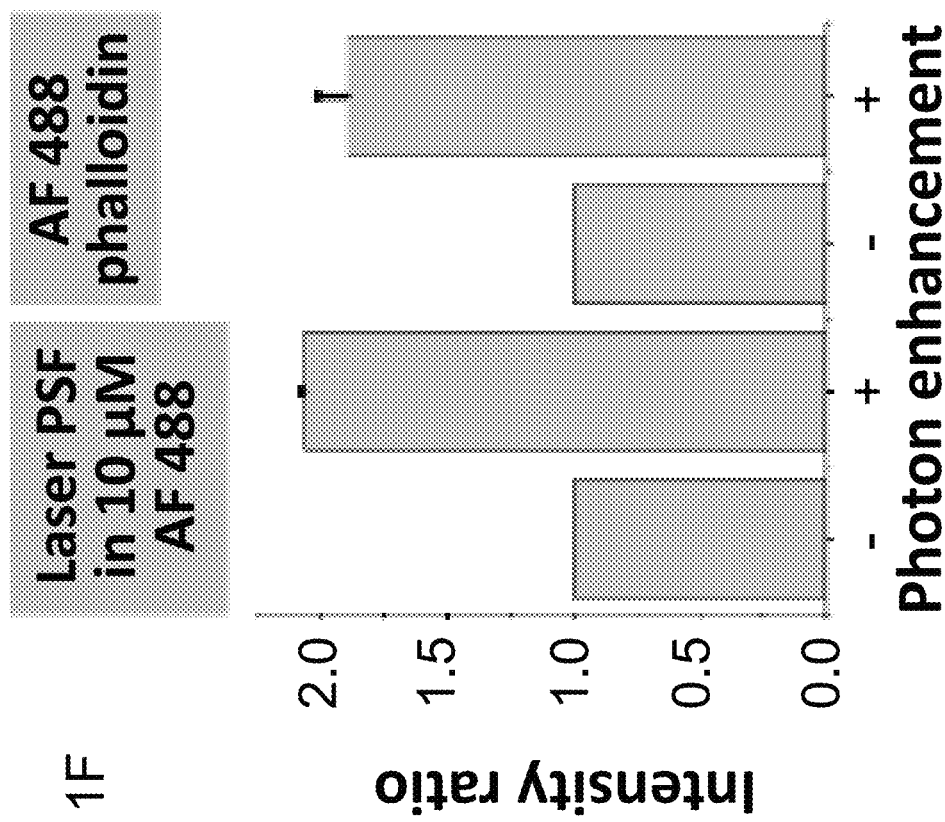

NA objective. At the coinciding focal plane, a no. 0 slide with a 10 μM AlexaFluor 488 solution covered with a coverslip was placed and the amount of fluorescence incident on the camera was measured when a static laser was focused at the common focal plane. This experiment was performed with and without the photon enhancement setup being blocked by a piece of matte black non-reflective photofoil (FIG. 1D). Strikingly, it was found that this caused an approximate doubling in the fluorescence collected with the photon enhancement setup (FIG. 1F). In addition, the photon collection was observed to increase when HeLa cells fixed and stained with AlexaFluor 488 phalloidin were placed at the common focal plane (FIG. 1E). Again, a near doubling in the amount of fluorescence collected with and without the photon enhancement setup being blocked was observed (FIG. 1F).

Figures 3, 3B:
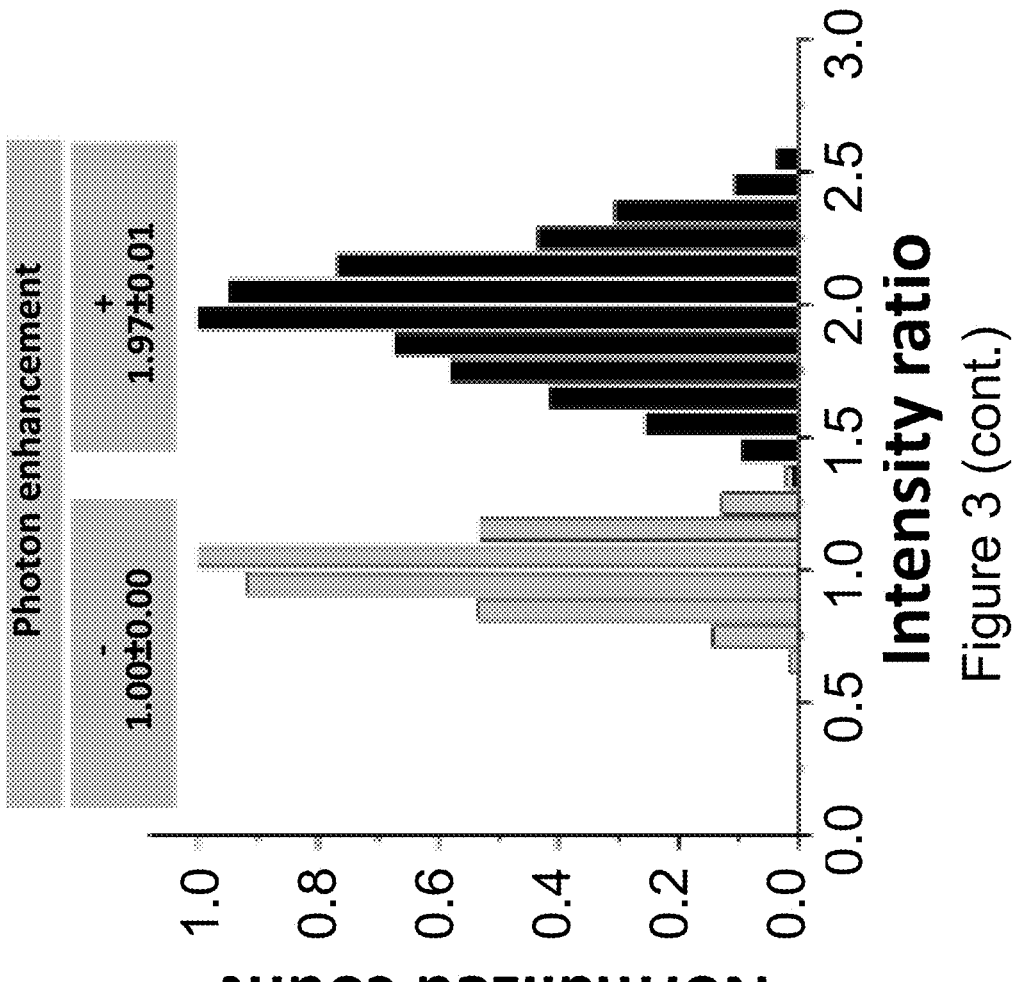

While imaging immobile samples is critical in many super-resolution techniques like PALM (Annibale et al., 2011, PloS One, 6:e22678) and STORM (Rust et al., 2006, Nature Methods, 3:793-796), the current study aimed to demonstrate that the novel photon enhancement setup improves the collection efficiency of photons from mobile particles. After aligning the setup in the same way as shown in FIG. 1C, mobile 500 nm Tetraspeck beads were tracked freely diffusing in phosphate buffered solution and it was found that a near doubling in the amount of photon collection was achieved here as well (FIG. 3).

While the fluorescence principles are generally the same, it was found to be necessary to test the photon enhancement setup in confocal microscopy due to its prevalence in biological imaging research (Jonkman et al., 2015, Journal of Biomolecular Techniques, 26:54-65). Therefore, the same setup as shown in FIG. 1C was implemented in a Leica TCS SP8 laser scanning confocal microscope (FIG. 4A). This setup was achieved by constructing an adapter that allowed the setup to be mounted above the stage, similar to the mount for the setup shown in FIG. 1. Under this paradigm, it was found that photon collection efficiency reached a maximum photon collection ratio of 1.35 compared to blocking of the photon enhancement setup (FIG. 4). Although not bound by any particularly theory, it is likely that a full doubling of the photon collection was not reached because the confocal microscope's 10× objective had an NA of 0.4 when compared to the photon enhancement setup's objective, which had an NA of 0.3. Due to this, a doubling in the amount of collected photons was likely not achieved. Nevertheless, this shortcoming is remedied in further iterations of the setup by ensuring the NA of the objective in the photon enhancement setup matches the NA of the objective in the microscope. Overall, the photon enhancement setup was applicable to epifluorescence as well as confocal microscopy.

In conclusion, the study described herein demonstrated how a 4f system, implemented as an objective and a lens, with a mirror at the back focal plane focused and reflected the light from an object at the front focal plane back to the object's original position and increased the total amount of photon collected by the microscope objective. It was also shown how this setup worked for in vitro and in vivo samples in both epifluorescence and confocal microscopy. As such, this photon enhancement setup, with proper integration into the microscope chassis, increases the number of photons collected by any type of fluorescence microscopy. This, in turn, improves optical resolution and signal-to-noise ratio as well as allows for a lower power illumination source to be used, which decreases photobleaching and phototoxicity.

In summary, standard fluorescence and super-resolution microscopy are widely-used techniques for visualizing cellular structures in fixed and live samples. To obtain the best optical resolution, collection of the maximum number of photons from each fluorophore is essential and achieved mainly by engineering higher numerical aperture objectives, designing higher quantum yield and photostable fluorophores, or increasing the excitation laser or lamp power. While great advancement has been made on objectives and fluorophores, progress cannot proceed linearly and simply increasing the laser power photobleaches fluorophores more quickly, causes more out of focus fluorescence, and is more phototoxic in live cell imaging. The present study demonstrated that a 4f system and mirror reflected and focused photons emitted away from the objective back toward the exact location of the fluorophore at the focal plane in both standard epifluorescence and confocal microscopy for in vitro and in vivo fluorescent samples. In this way, the number of photons from a variety of samples, which were collected by the objective and reach the camera, were increased. Overall, photon enhancement microscopy is broadly implemented in principle on any modern fluorescence microscopy method to increase photon collection efficiency and optical resolution.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A photon enhancement apparatus, comprising:
   a housing having first and second ends;
   first and second lenses having a same focal length, positioned concentrically within the housing separated by a distance equal to 2× the focal length;
   a reflective component positioned at the second end of the housing at a distance of one focal length from the second lens; and
   an imaging platform having at least one transparent region configured to hold a sample, positioned in optical communication with the housing, at a distance of one focal length from the first lens.

2. The photon enhancement apparatus of claim 1, wherein the reflective component is a mirror.

3. The photon enhancement apparatus of claim 1, wherein the first and second lenses are biconvex lenses.

4. The photon enhancement apparatus of claim 1, further comprising a multi-point adjuster mount fixedly connected to the housing.

5. A microscope, comprising:
   an imaging platform having at least one transparent region;
   a light source configured to illuminate the at least one transparent region;
   an objective positioned below the at least one transparent region, configured to gather light from the at least one transparent region;
   a detector positioned below the objective; and
   a photon enhancement apparatus, comprising:
      a housing having first and second ends;
      first and second lenses having a same focal length, positioned concentrically within the housing separated by a distance equal to 2× the focal length; and a reflective component positioned at the second end of the housing at a distance of one focal length from the second lens;

wherein the transparent platform is positioned in optical communication with the housing, at a distance of one focal length from the first lens.

6. The microscope of claim 5, wherein the reflective component directs at least one photon to the detector.

7. The microscope of claim 5, further comprising:
a dichroic reflective component positioned between the objective and the detector, configured to direct light from the light source to the platform; and
a tube lens positioned between the detector and the dichroic reflective component.

8. The microscope of claim 7, further comprising a filter positioned between the dichroic reflective component and the detector, configured to select photons of different wavelengths.

9. The microscope of claim 7, further comprising a multi-point adjuster mount fixedly attached to the photon enhancement apparatus.

10. The microscope of claim 5, wherein the microscope is an optical microscope, confocal microscope, single plane illumination microscope, fluorescence microscope, spinning disc confocal/fluorescence microscope, upright microscope, super-resolution microscope, stochastic optical reconstruction microscope, stimulated emission depletion microscope, photoactivated light microscope, or 4Pi microscope.

11. A method for increasing a number of photons recognized by a detector in a microscopy imaging technique, the method comprising:
(i) illuminating a platform having a transparent region with a plurality of photons, the platform comprising a sample, in an illumination direction;
(ii) collecting at least a portion of photons transmitted through the platform in a photon enhancement apparatus comprising first and second lenses and a mirror;
(iii) reflecting, with the mirror, at least a portion of the collected photons back through the platform in a direction opposite the illumination direction;
(iv) collecting, with a detector, photons emitted, reflected, and/or scattered by the sample and the photons directed by the photon enhancement apparatus; and
(v) forming respective portions of a microscopy image representing the amount of photons collected from respective elements of the sample.

12. The method of claim 11, wherein the illumination step comprises transmitting light through a lens.

13. The method of claim 11, wherein the sample is a planar sample, and the detector is spaced from the sample in a direction transverse to the plane of the sample.

14. The method of claim 11, further comprising:
(vi) calculating a scattering parameter using a mathematical expression which links the components of the microscopy image and the values of a scattering parameter for multiple respective elements of the sample, the respective value of the scattering parameter for each element of the sample being indicative of a tendency of that element of the sample to scatter photons; and
(vii) forming an enhanced image of the sample using the obtained values of the scattering parameter.

15. The method of claim 14, wherein the mathematical expression expresses the value of the scattering parameter for a given said element of the sample by employing one or more average parameters, each indicating an average of the value of the scattering parameter over a given said element of the sample by employing one or more average parameters, each indicating an average of the value of the scattering parameter over a corresponding region which encircles a line extending parallel to the illumination direction to the given element of the sample.

* * * * *